United States Patent
Romem et al.

(10) Patent No.: US 10,728,331 B2
(45) Date of Patent: Jul. 28, 2020

(54) TECHNIQUES FOR DYNAMIC CACHE USE BY AN INPUT/OUTPUT DEVICE

(71) Applicant: Excelero Storage Ltd., Tel Aviv (IL)

(72) Inventors: Yaniv Romem, Jerusalem (IL); Ofer Oshri, Kfar Saba (IL); Omri Mann, Jerusalem (IL)

(73) Assignee: EXCELERO STORAGE LTD., Tel Aviv (IL)

( * ) Notice: Subject to any disclaimer, the term of this patent is extended or adjusted under 35 U.S.C. 154(b) by 317 days.

(21) Appl. No.: 15/630,003

(22) Filed: Jun. 22, 2017

(65) Prior Publication Data
US 2017/0374150 A1    Dec. 28, 2017

Related U.S. Application Data

(60) Provisional application No. 62/353,051, filed on Jun. 22, 2016.

(51) Int. Cl.
| | | |
|---|---|---|
| *G06F 15/16* | (2006.01) | |
| *H04L 29/08* | (2006.01) | |
| *G06F 3/06* | (2006.01) | |
| *H04L 29/06* | (2006.01) | |
| *G06F 15/173* | (2006.01) | |
| *G06F 12/0813* | (2016.01) | |

(52) U.S. Cl.
CPC ........ *H04L 67/1097* (2013.01); *G06F 3/0604* (2013.01); *G06F 3/064* (2013.01); *G06F 3/067* (2013.01); *G06F 3/0631* (2013.01); *G06F 15/17331* (2013.01); *H04L 67/2842* (2013.01); *H04L 67/42* (2013.01); *G06F 12/0813* (2013.01); *G06F 2212/154* (2013.01); *G06F 2212/163* (2013.01); *G06F 2212/502* (2013.01)

(58) Field of Classification Search
CPC ................. G06F 11/34; G06F 12/0813; G06F 15/17331; G06F 2212/154; G06F 2212/163; G06F 2212/502; G06F 3/0604; G06F 3/0631; G06F 3/064; G06F 3/067; H04L 67/1097; H04L 67/2842; H04L 67/42

See application file for complete search history.

(56) References Cited

U.S. PATENT DOCUMENTS

| | | | |
|---|---|---|---|
| 7,573,895 B2 | 8/2009 | King | |
| 7,685,254 B2 * | 3/2010 | Pandya | .......... H04L 63/20 709/217 |
| 7,944,920 B2 * | 5/2011 | Pandya | .......... H04L 29/06 370/392 |

(Continued)

*Primary Examiner* — Moustafa M Meky
*Assistant Examiner* — Thorne E Waugh
(74) *Attorney, Agent, or Firm* — M&B IP Analysts, LLC (57) ABSTRACT

A system and method for dynamic caching by a client device having remote memory access to a server. The system includes: a processing circuitry; and at least one memory, the at least one memory containing instructions that, when executed by the processing circuitry, configure the system to: configure a network interface of the client device to: request a memory allocation of at least a portion of a storage of the client device; receive, in real-time, the requested memory allocation of the client device storage; and store, in the allocated at least a portion of the client device storage, at least a first portion of cached metadata, wherein the cached metadata corresponds to at least an access operation between the client device and the server.

16 Claims, 4 Drawing Sheets

(56) References Cited

U.S. PATENT DOCUMENTS

| | | | |
|---|---|---|---|
| 9,311,110 B2* | 4/2016 | Tamir | G06F 9/4416 |
| 9,467,512 B2* | 10/2016 | Tamir | G06F 15/167 |
| 9,864,537 B2* | 1/2018 | Chinnakkonda Vidyapoornachary | G11C 29/52 |
| 10,257,273 B2* | 4/2019 | Govind | H04L 67/1097 |
| 2013/0198312 A1* | 8/2013 | Tamir | G06F 15/167 709/212 |
| 2014/0143364 A1 | 5/2014 | Guerin et al. | |
| 2014/0214997 A1 | 7/2014 | Metzler et al. | |
| 2015/0012735 A1* | 1/2015 | Tamir | G06F 9/4416 713/2 |
| 2015/0067088 A1 | 3/2015 | Guerin et al. | |
| 2017/0039145 A1* | 2/2017 | Wu | G06F 12/0813 |

\* cited by examiner

TECHNIQUES FOR DYNAMIC CACHE USE BY AN INPUT/OUTPUT DEVICE

CROSS-REFERENCE TO RELATED APPLICATIONS

This application claims the benefit of U.S. Provisional Application No. 62/353,051 filed on Jun. 22, 2016, the contents of which are hereby incorporated by reference.

TECHNICAL FIELD

The present disclosure relates generally to accessing remote storage devices, and more particularly to efficiently accessing Remote Direct Memory Access devices.

BACKGROUND

Network accessible storages have and continue to become increasingly prevalent. Network accessible storages provide access to files and data without requiring local storage. A particular method for providing access to storages available over a network is remote direct memory access. Remote direct memory access allows for direct access of the memory of one computer by the memory of another directly and without involving either computer's operating system. This direct access permits high-throughput, low-latency networking as compared to less direct methods of remote access, especially when utilized in massively parallel computer clusters.

A challenge faced by network accessible storage devices is that such devices are typically slower to access than local storages. Further, aggregations of slowed accesses can result in severe underperformance when utilizing remote storage access than for local storage access, particularly when scaling up to incorporate a high number of computers accessible over a network. Thus, even when remote direct memory access is utilized, remote access may be significantly less efficient than local access.

It would therefore be advantageous to provide a solution that would overcome the challenges noted above by improving communications with network accessible storage devices.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein also include a system for dynamic caching by a client device having remote memory access to a server. The system includes: a processing circuitry; and at least one memory, the at least one memory containing instructions that, when executed by the processing circuitry, configure the system to: configure a network interface of the client device to: request a memory allocation of at least a portion of a storage of the client device; receive, in real-time, the requested memory allocation of the client device storage; and store, in the allocated at least a portion of the client device storage, at least a first portion of cached metadata, wherein the cached metadata corresponds to at least an access operation between the client device and the server.

Certain embodiments disclosed herein also include a non-transitory computer readable medium having stored thereon causing a processing circuitry to execute a process, the process comprising: configuring a network interface of the client device to: request a memory allocation of at least a portion of a storage of the client device; receive, in real-time, the requested memory allocation of the client device storage; and store, in the allocated at least a portion of the client device storage, at least a first portion of cached metadata, wherein the cached metadata corresponds to at least an access operation between the client device and the server.

Certain embodiments disclosed herein also include a method for dynamic caching by a client device having remote memory access to a server. The method comprises: configuring a network interface of the client device to: request a memory allocation of at least a portion of a storage of the client device; receive, in real-time, the requested memory allocation of the client device storage; and store, in the allocated at least a portion of the client device storage, at least a first portion of cached metadata, wherein the cached metadata corresponds to at least an access operation between the client device and the server.

Certain embodiments disclosed herein also include a system for dynamic caching by a client device having remote memory access to a server. The system includes: a processing circuitry; and at least one memory, the at least one memory containing instructions that, when executed by the processing circuitry, configure the system to: configure a network interface of the client device to: request a memory allocation of at least a portion of a storage of the client device from a driver agent of the client device, wherein the driver agent is configured to: dynamically allocate at least a portion of a storage of the client device and to the network interface; and store, in the allocated at least a portion of the client device storage, at least a first portion of cached metadata, wherein the cached metadata corresponds to at least an access operation between the client device and the server.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for dynamic caching by a client device having remote memory access to a server. A memory allocation is requested from a storage of the client device. A dynamic allocation of at least a portion of memory of the client device storage is received. At least a first portion of cached metadata is stored in the dynamically allocated portion of memory. The cached metadata corresponds at least to an access operation between the client device and the server. A second portion of the cached metadata may be stored in a storage of an input/output device of the client device.

The embodiments disclosed herein may provide increased efficiency of remote memory access and, in particular, remote direct memory access, as compared to, for example, remote direct memory access without dynamic caching of metadata. Specifically, the disclosed embodiments may be utilized to improve access times and communications for remote direct memory access.

Figure 1:
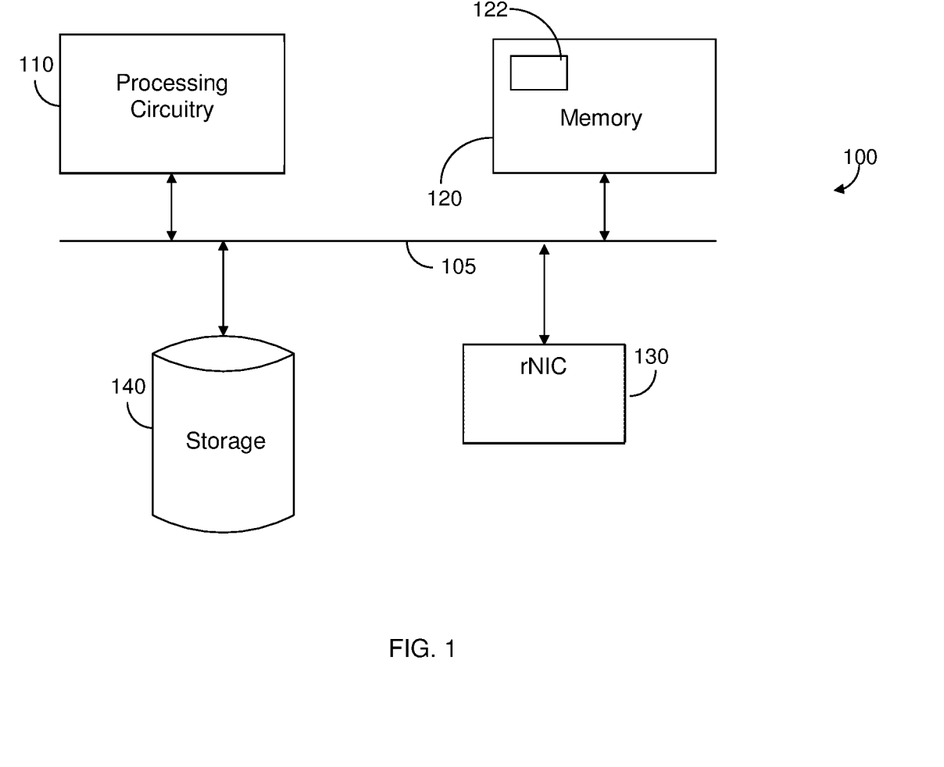
FIG. 1 is a schematic diagram of a server for providing remote direct memory access storage to a client device.
Figure 2:
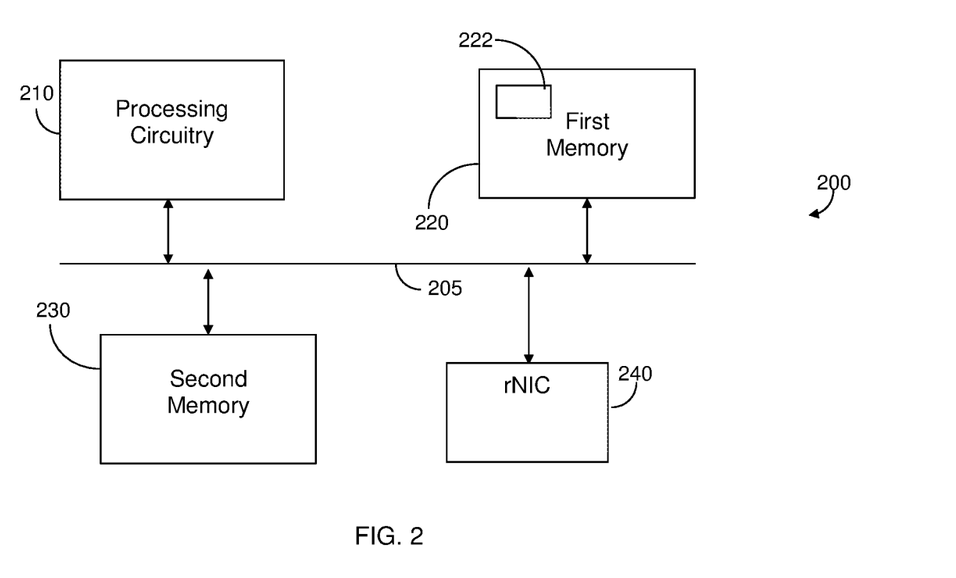
FIG. 2 is a schematic diagram of a client device configured for remote direct memory access.

FIG. 1 shows an example schematic diagram illustrating a server 100 for providing remote direct memory access storage to a client device (e.g., the client device 200, FIG. 2). The server 100 includes a processing circuitry 110, a memory 120, a storage 130, and an input/output (I/O) device such as a remote network interface controller (rNIC) 140. In an embodiment, the components of the server 100 may be communicatively connected via a bus 105.

The processing circuitry 110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 120 may be volatile (e.g., RAM, etc.), non-volatile (e.g., ROM, flash memory, etc.), or a combination thereof. In one configuration, computer readable instructions to implement one or more embodiments disclosed herein may be stored in the storage 140.

Alternatively or collectively, the memory 120 may be configured to store software.

Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 110 to provide remote direct memory access.

The memory 120 may further include a memory portion 122 containing the instructions for causing the processing circuitry 110 to provide remote direct memory access. The storage 140 may be magnetic storage, optical storage, and the like, and may be realized, for example, as flash memory or other memory technology, CD-ROM, Digital Versatile Disks (DVDs), or any other medium which can be used to store the desired information. The storage 140 may store instructions for executing the methods as described herein.

The remote network interface controller 130 allows the server 100 to communicate with a network (not shown) for purposes such as, but not limited to, receiving data to be stored in the storage 140, providing access to data stored in the storage 140 and the like. The communications via the network may therefore be utilized to provide remote direct memory access to data stored in the storage 140 by a client device (e.g., the client device 200, FIG. 2).

FIG. 2 shows an example schematic diagram illustrating a client device 200 configured for remote direct memory access storage. In an example implementation, the client device 200 is configured to communicate with the server 100, FIG. 1, over a network (not shown) to store and retrieve data via remote direct memory access. The client device 200 includes a processing circuitry 210, a memory 220, a second memory 230, and an input/output (I/O) device such as a remote network interface controller (rNIC) 240. In an embodiment, the components of the client device 200 may be communicatively connected via a bus 205.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), general-purpose microprocessors, microcontrollers, digital signal processors (DSPs), and the like, or any other hardware logic components that can perform calculations or other manipulations of information.

Each of the first memory 220 and the second memory 230 may be volatile (e.g., RAM, etc.), non-volatile (e.g., ROM, flash memory, etc.), or a combination thereof. The first memory 220 may store, e.g., instructions. The second memory 230 may be utilized by the client device 200 to store a buffer cache.

The first memory 220 may be configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform remote direct memory access.

The first memory 220 may further include a memory portion 222 containing the instructions for causing the processing circuitry 210 to perform remote direct memory access. In some implementations, the first memory 220 may further include a second memory portion (not shown) allocated for use by an input/output device such as, but not limited to, the remote network interface controller 240.

The remote network interface controller 240 allows the client device 200 to communicate with a network (not shown) for purposes such as, but not limited to, retrieving data stored via remote direct memory access, sending data to be stored via remote direct memory access, and the like. The remote network interface controller may be configured to perform remote direct memory access and to cache data in, e.g., the second memory 230. To this end, in an embodiment, the remote network interface controller 240 may include or have disposed thereon a system for dynamic caching (e.g., the dynamic caching system 300, FIG. 3). In an example implementation, the caching system may be a system-on-chip included in the remote network interface controller 240.

It should be noted that the embodiments described herein with respect to FIG. 2 are discussed as featuring a first memory 220 and a second memory 230 merely for simplicity purposes and without limiting the disclosed embodiments. The first memory 220 and the second memory 230 may be equally implemented as first and second portions of the same memory (not shown) without departing from the scope of the disclosure.

Figure 3:
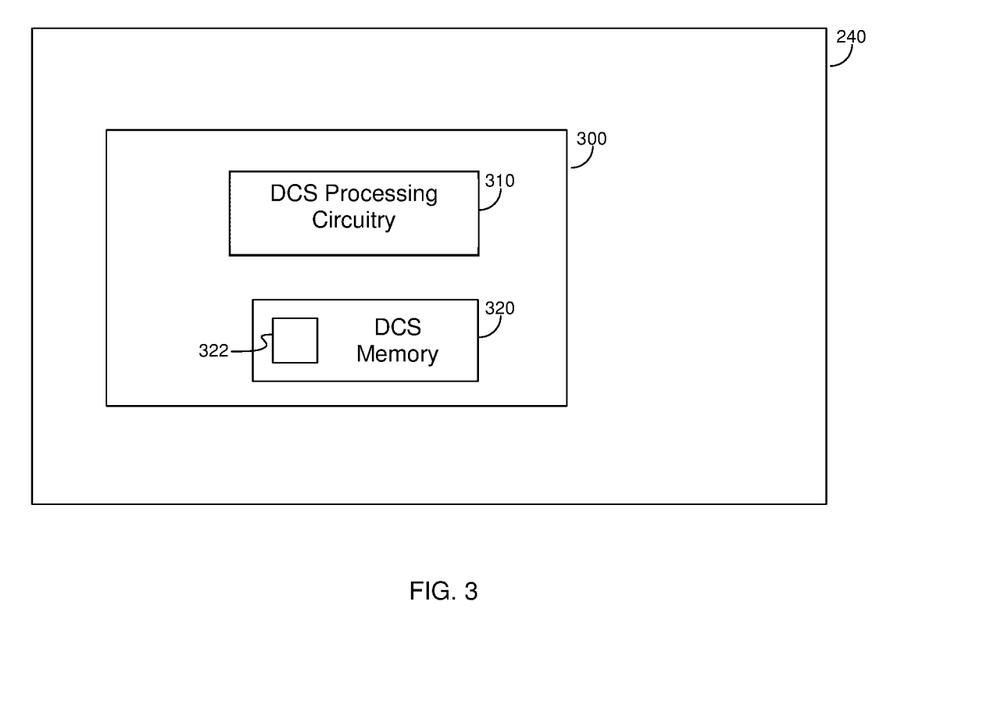
FIG. 3 is a schematic diagram of a dynamic caching system according to an embodiment.

FIG. 3 is an example schematic diagram of a dynamic caching system 300 according to an embodiment. In the example schematic diagram shown in FIG. 3, the dynamic caching system 300 is implemented as a system-on-a-chip (SoC) included in the remote network interface controller 240, FIG. 2.

In the example schematic diagram shown in FIG. 3, the dynamic caching system 300 includes a dynamic caching system (DCS) processing circuitry 310 and a DCS memory 320. The DCS processing circuitry 310 may be realized as one or more hardware logic components and circuits. The DCS memory 320 may be volatile (e.g., RAM, etc.), non-volatile (e.g., ROM, flash memory, etc.), or a combination thereof.

The DCS memory 322 may include a memory portion 322 containing cached metadata of remote direct memory access instructions sent between the client device 200 and the server 100. In an embodiment, the cached metadata may be virtual block metadata including a map of a plurality of virtual addresses, each virtual address corresponding to either a unique secondary virtual address or to a unique physical address of a storage device.

In some implementations, the DCS memory 320 may not be sufficiently large to contain the require metadata. To this end, in some implementations, a driver agent (not shown) may be installed on a memory accessible to, e.g., an operating system of the client device 200 such as, for example, the second memory 230 of the client device 200. The agent is configured to dynamically allocate the portions of the second memory 230 as required to store the cached metadata. The agent may be configured to release portions of the second memory 230 according to the needs of the client device 200 and the remote network interface controller 240.

It should be noted that the dynamic caching system 300 is described herein as being implemented in the client device 200 merely for example purposes and without limiting the disclosed embodiments. In some implementations, the dynamic caching system may be implemented in, e.g., a remote server (not shown). In such implementations, the dynamic caching system 300 is not configured to cache metadata in the DCS memory 322, and may cause caching of metadata by the client device 200 using, for example, the driver agent described herein above.

Figure 4:
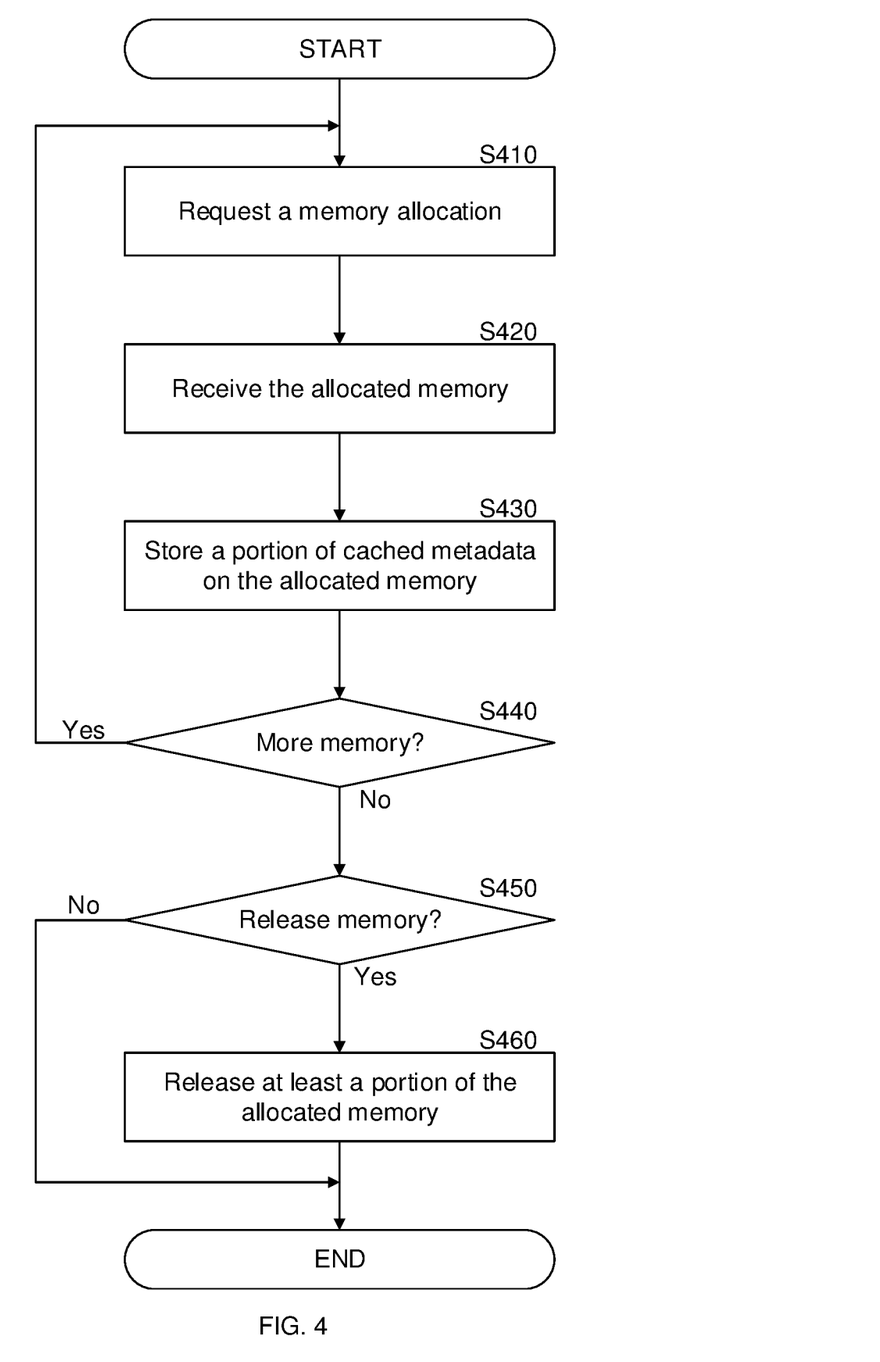
FIG. 4 is a method for dynamic caching by a client device having remote memory access to a server according to an embodiment.

FIG. 4 is an example flowchart 400 illustrating a method for dynamic caching by a client device having remote memory access to a server according to an embodiment. In an embodiment, the method is for dynamically allocating memory of a cache to an input/output (I/O) interface such as a network interface controller (e.g., the remote network interface controller 240, FIG. 2) of a client device (e.g., the client device 200, FIG. 2) having access to a server (e.g., the server 100, FIG. 1). In an embodiment, the method is performed by the dynamic caching system 300, FIG. 3.

At S410, an allocation of at least a portion of memory of the client device is requested. In an embodiment, S410 may include sending a request for allocation of system memory to an agent installed on the client device that is configured to dynamically allocate memory.

At S420, the requested allocation of memory is received. In an embodiment, S420 includes receiving a block of addresses, each block corresponding to a portion of the allocated memory. The requested allocation may be performed by the agent installed on the client device.

At S430, at least a portion of metadata is stored in the allocated memory. In an embodiment, a first portion of the metadata may be stored in the allocated memory, and a second portion of the metadata may be stored in a secondary memory (e.g., a memory of the dynamic caching system 300).

At S440, it is determined if additional memory is required and, if so, execution continues with S410; otherwise, execution continues with S450.

At S450, it is determined if at least a portion of the allocated memory should be released and, if so, execution continues with S460; otherwise, execution terminates. In an embodiment, if it is not determined that at least a portion of the allocated memory should be released, execution may continue with S450, thereby allowing for periodic or otherwise repeated checking whether the allocated memory should be released.

In an embodiment, S450 may include determining whether a sufficient storage of the dynamic caching system is available for storing the cached metadata. In a further embodiment, when sufficient memory (e.g., of the DCS memory portion 322) is available in the dynamic caching system for storing the cached metadata, the cached metadata may be stored therein and the corresponding allocated memory may be released for other use. In an embodiment, it is determined that there is sufficient memory when an amount of memory required to store the cached metadata is less than a combined total amount of memory of the dynamic caching system and the allocated memory.

In another embodiment, S450 may include receiving a release instruction from a driver agent of the client device and, upon receiving the release instruction, releasing the allocated memory. In yet another embodiment, the allocated memory may be released when it is determined that requirements of the client device storage are prioritized over the cached metadata, thereby freeing the allocated memory for more important or otherwise higher priority tasks.

At S460, at least a portion of the allocated memory is released, thereby freeing the allocated memory for other storage. In an embodiment, S460 may include synchronizing metadata between the allocated memory and a portion of a locally accessible storage. To this end, in a further embodiment, S460 may include sending a request for metadata synchronization to the system hosting the remotely accessible storage in which the allocated memory is located. In yet a further embodiment, S460 may include determining whether the cached metadata and the remotely accessible metadata match and, if not, synchronizing the metadata.

It should be noted that various embodiments are described herein as a system implemented (e.g., as a system-on-a-chip) in or on a network interface controller merely for example purposes and without limiting the disclosed embodiments. The embodiments disclosed herein are equally applicable to systems included in or on any other input/output (I/O) devices configured to perform direct memory access without departing from the scope of the disclosure. Such I/O devices may include a controller configured to request memory allocations from a processing circuitry of, e.g., a server configured for direct memory access.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A system for dynamic caching for a client device having remote memory access to a server, comprising:
a processing circuitry; and
at least one memory, the at least one memory containing instructions that, when executed by the processing circuitry, configure the system to:
configure a network interface of the client device to:
request a memory allocation of at least a portion of a storage of the client device;
receive, in real-time, the requested memory allocation of at least a portion of the client device storage;
store, in the allocated at least a portion of the client device storage, at least a first portion of cached metadata, wherein the cached metadata corresponds to at least an access operation between the client device and the server;
store a second portion of the cached metadata in at least a portion of the at least one memory; and
release at least a portion of the allocated client device storage, when it is determined that an amount of memory required to store the cached metadata is less than a combined total amount of memory of the system and the allocated client device storage.

2. The system of claim 1, wherein the system is included in the network interface.

3. The system of claim 2, wherein the network interface is a network interface controller, wherein the system is a system-on-a-chip deployed on the network interface controller.

4. The system of claim 1, wherein the network interface is further configured to:
release at least a portion of the allocated client device storage, when a release instruction is received from a driver agent installed on the client device.

5. The system of claim 1, wherein the network interface is further configured to:
release the allocated client device storage, when it is determined that requirements of the client device storage are prioritized over the cached metadata.

6. The system of claim 1, wherein the network interface is further configured to:
synchronize the cached metadata stored in the client device and metadata stored in the server, when it is determined that the cached metadata and the metadata stored in the server do not match.

7. The system of claim 1, wherein the requested memory allocation is received as a plurality of block addresses corresponding to a plurality of respective portions of the client device storage.

8. A non-transitory computer readable medium having stored thereon instructions for causing a processing circuitry to execute a process, the process comprising:
configuring a network interface of the client device to:
request a memory allocation of at least a portion of a storage of the client device;
receive, in real-time, the requested memory allocation of the at least a portion of the client device storage;
store, in the allocated at least a portion of the client device storage, at least a first portion of cached metadata, wherein the cached metadata corresponds to at least an access operation between the client device and the server;
store a second portion of the cached metadata in at least a portion of at least one memory of a dynamic caching system; and
release at least a portion of the allocated client device storage, when it is determined that an amount of memory required to store the cached metadata is less than a combined total amount of memory of the system and the allocated client device storage.

9. A method for dynamic caching by a client device having remote memory access to a server, comprising:
configuring a network interface of the client device to:
request a memory allocation of at least a portion of a storage of the client device;
receive, in real-time, the requested memory allocation of the at least a portion of the client device storage;
store, in the allocated at least a portion of the client device storage, at least a first portion of cached metadata, wherein the cached metadata corresponds to at least an access operation between the client device and the server;

store a second portion of the cached metadata in at least a portion of at least one memory of a dynamic caching system; and release at least a portion of the allocated client device storage, when it is determined that an amount of memory required to store the cached metadata is less than a combined total amount of memory of the system and the allocated client device storage.

10. The method of claim 9, wherein the network interface is a network interface controller, wherein the network interface controller is configured by a system-on-a-chip deployed on the network interface controller.

11. The method of claim 9, further comprising:

configure the network interface to:

release at least a portion of the allocated client device storage, when a release instruction is received from a driver agent installed on the client device.

12. The method of claim 9, further comprising:

configure the network interface to:

release the allocated client device storage, when it is determined that requirements of the client device storage are prioritized over the cached metadata.

13. The method of claim 9, further comprising:

configure the network interface to:

synchronize the cached metadata stored in the client device and metadata stored in the server, when it is determined that the cached metadata and the metadata stored in the server do not match.

14. The method of claim 9, wherein the requested memory allocation is received as a plurality of block addresses corresponding to a plurality of respective portions of the client device storage.

15. A system for dynamic caching by a client device having remote memory access to a server, comprising:

a processing circuitry; and at least one memory, the at least one memory containing instructions that, when executed by the processing circuitry, configure the system to:

configure a network interface of the client device to:

request a memory allocation of at least a portion of a storage of the client device from a driver agent of the client device, wherein the driver agent is configured to:

dynamically allocate at least a portion of a storage of the client device and to the network interface;

store, in the allocated at least a portion of the client device storage, at least a first portion of cached metadata, wherein the cached metadata corresponds to at least an access operation between the client device and the server;

store a second portion of the cached metadata in at least a portion of the at least one memory; and release at least a portion of the allocated client device storage, when it is determined that an amount of memory required to store the cached metadata is less than a combined total amount of memory of the system and the allocated client device storage.

16. The system of claim 15, wherein the network interface is further configured to:

release at least a portion of the allocated at least a portion of the client device storage, when a release instruction is received from the driver agent.

* * * * *